Figure 1:
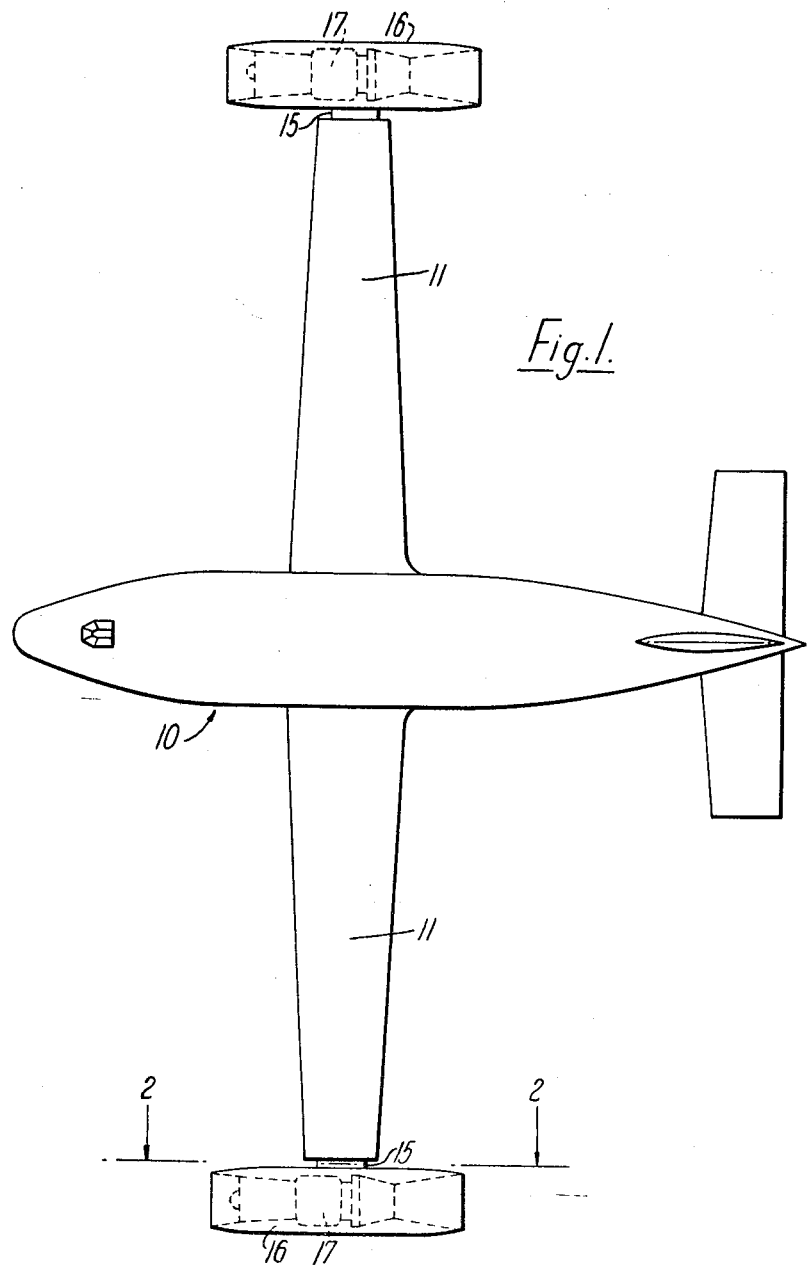

May 14, 1963

D. G. GOODALL 3,089,668

PISTON AND CYLINDER ARRANGEMENT FOR
TILTING AIRCRAFT POWERPLANT

Filed Sept. 1, 1961

3 Sheets-Sheet 2

Inventor
Donald George Goodall

By
Fred. E. Shoemaker
Fred L. Witherspoon, Attorney

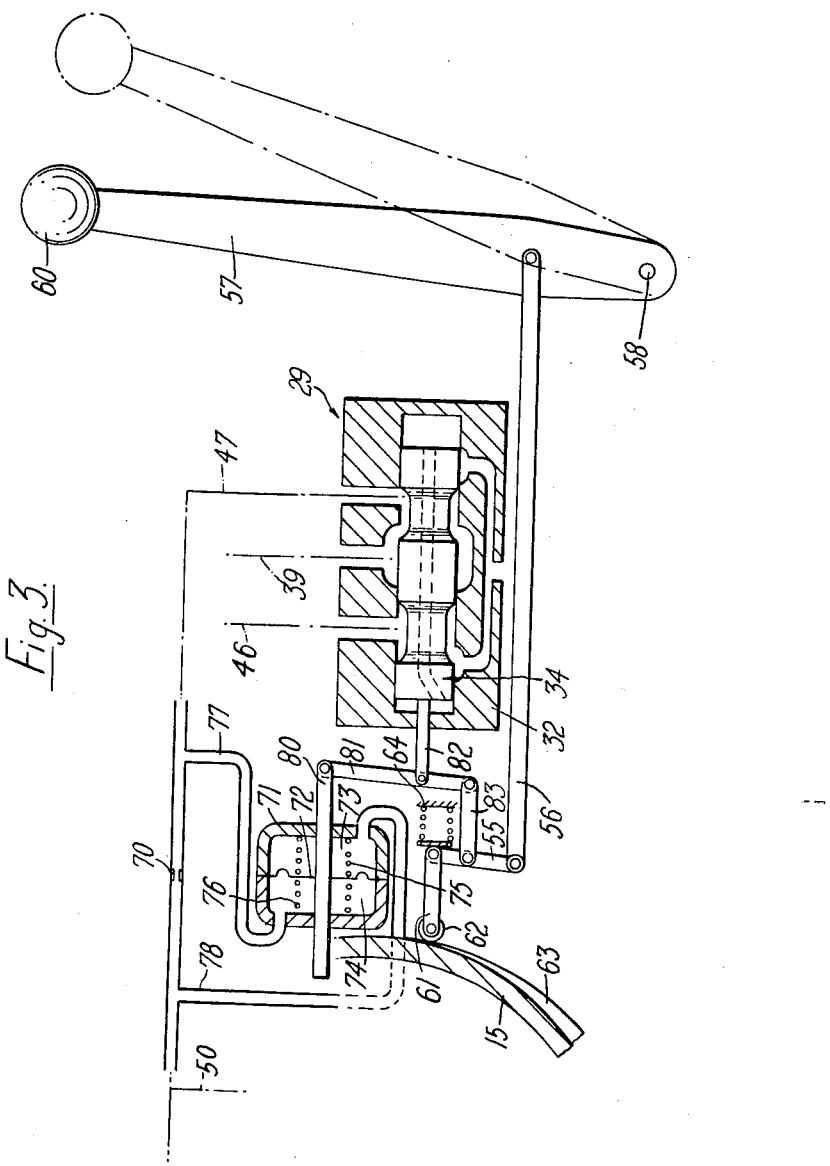

United States Patent Office 3,089,668
Patented May 14, 1963

3,089,668
PISTON AND CYLINDER ARRANGEMENT FOR TILTING AIRCRAFT POWERPLANT
Donald George Goodall, Hucknall, England, assignor to Rolls-Royce Limited, Derby, England, a company of Great Britain
Filed Sept. 1, 1961, Ser. No. 135,589
Claims priority, application Great Britain Sept. 15, 1960
8 Claims. (Cl. 244—12)

This invention concerns a piston and cylinder arrangement and, although the invention is not so restricted, it is more particularly concerned with a piston and cylinder arrangement for effecting rotation of rotatable, engine-carrying, pods of a vertical take-off aircraft.

According to the present invention, there is provided a piston and cylinder arrangement comprising a cylinder within which is mounted a piston, control means for admitting pressure fluid to a selected side of the piston and for withdrawing it from the opposite side thereof, whereby to effect relative movement of the said piston and cylinder, said control means including a valve member which is settable in a neutral position in which the pressure fluid can neither be supplied to, nor exhausted from, said cylinder, and means, operative upon displacement of the valve member from the neutral position, to restore the valve member to the neutral position after the piston and cylinder have moved relatively to a predetermined extent.

Preferably the cylinder is a movable cylinder within which is mounted a fixed piston, the cylinder being adapted to be moved by said pressure fluid.

Preferably the valve member may be moved into a number of positions away from said neutral position, the valve member being restored to the neutral position after the cylinder has moved a distance which is related to the extent to which the valve member had been displaced from the neutral position.

Preferably the said movement of the cylinder is rotary movement. Thus the cylinder may be provided internally with radially extending annular flanges between which is mounted a cylindrical member, said cylindrical member carrying at least one vane which constitutes a piston within said cylinder.

Preferably there are not more than four such vanes, the said vanes being spaced from each other by equal angular intervals.

The means for restoring the valve member may comprise means responsive to the velocity at which the pressure fluid is admitted to the said selected side of the piston. Thus the means for restoring the valve member may be controlled by the pressure difference across an orifice in a conduit through which the pressure fluid is admitted to the selected side of the piston, the said pressure difference being reduced as the valve member is moved towards the neutral position.

Additionally, or alternatively, the means for restoring the valve member may comprise cam means carried by said cylinder. Preferably the cam means are disposed externally of the said cylinder.

The piston and cylinder arrangement may comprise a lever which is connected by a linkage to the valve member so that movement of the lever in one direction or the other from a central position effects corresponding movement of the valve member, said linkage including a cam follower which engages the cam disposed externally of the cylinder, the said cam being adapted to cause movement of the valve member in the opposite direction to that caused by the lever.

The invention also comprises a vertical take-off aircraft comprising at least one jet propulsion engine mounted in a pod which is rotatably mounted with respect to fixed structure of said aircraft, and a piston and cylinder arrangement as set forth above for effecting rotation of the pod between a horizontal and vertical position.

Preferably there are two pods which are mounted at the wing tips of the aircraft.

Figure 2:
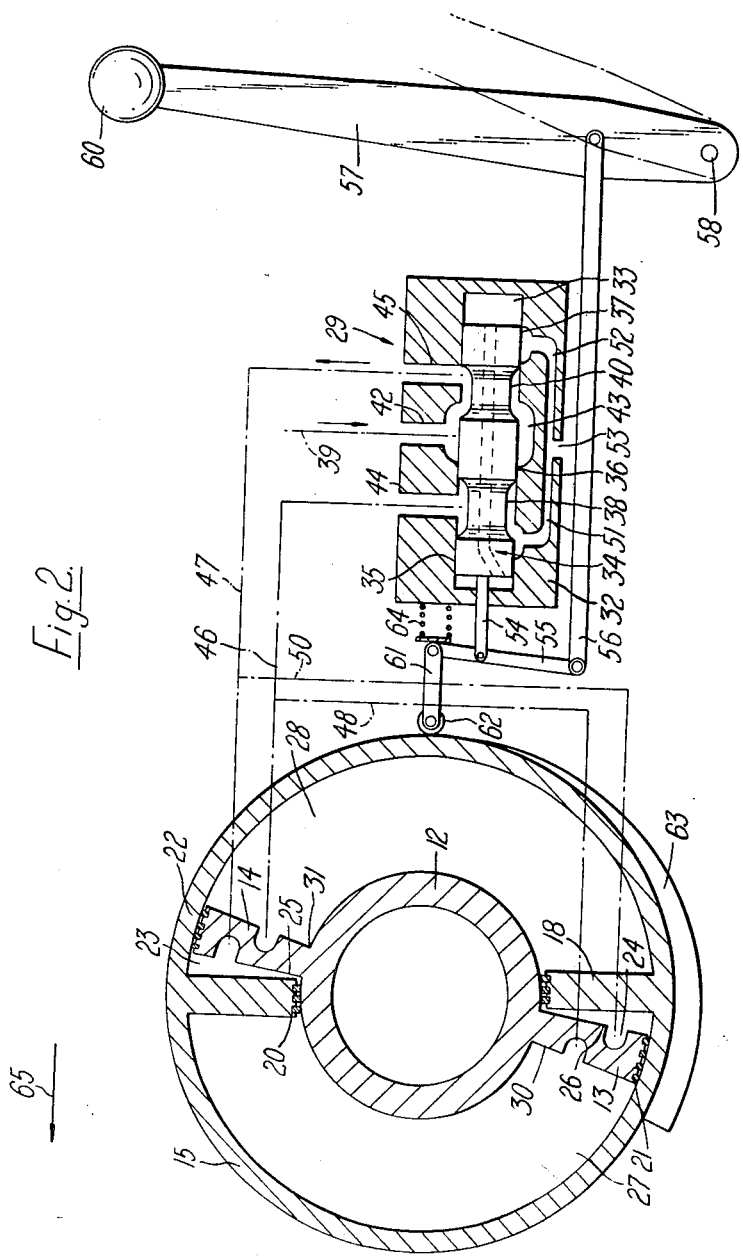

The invention is illustrated, merely by way of example, in the accompanying drawings, in which:

FIGURE 1 is a plan view of an aircraft provided with engine-carrying pods which are rotatable by means of a piston and cylinder arrangement according to the present invention, FIGURE 2 is a diagrammatic section taken on the line 2—2 of FIGURE 1 and illustrating the said piston and cylinder arrangement, and FIGURE 3 is a broken away sectional view illustrating a modification of the invention.

Referring to the drawings, an aircraft 10 has wings 11 each of whose tips is provided with a fixed cylindrical member 12 (see FIGURE 2).

Each of the cylindrical members 12 has a pair of diametrically oppositely disposed radial vanes 13, 14, which constitute fixed pistons. Each pair of pistons 13, 14 is mounted within a cylindrical rotor 15 and each rotor 15 is secured to a pod 16 within which is mounted a gas turbine engine 17. Each rotor 15 may be mounted at the wing tips by means of roller bearings (not shown).

Each of the rotors 15 is provided internally with diametrically opposed, radially extending flanges 18 between which the member 12 is mounted. Labyrinth seals 20 are provided between the flanges 18 and the member 12 and labyrinth seals 21, 22 are provided between the vanes 13, 14 respectively and the rotor 15.

If desired the labyrinth seals 20–22 may be replaced by square section piston rings, or by pressure balanced seals, or by spring-pressed pistons.

The pods 16 are rotatable, e.g. through 100°, between the horizontal position shown in FIGURE 1, which is the position adopted for forward flight, and a substantially vertical position (not shown), which is used for vertical take-off and landing.

The pods 16 may be rotated in either angular sense to any desired position within this 100° arc. This may be done either by admitting high pressure fluid (e.g. at 3000 p.s.i.) from a source (not shown) to spaces 23, 24 by exhausting low pressure fluid (e.g. at 100 p.s.i.) from spaces 27, 28, or by admitting high pressure fluid to the spaces 27, 28 and exhausting low pressure fluid from the spaces 23, 24. The spaces 23, 24 are respectively provided between faces 25, 26 of the vanes 14, 13, respectively and the adjacent faces of the flanges 18 while the spaces 27, 28 are respectively provided between faces 30, 31 of the vanes 13, 14 respectively and the adjacent faces of the flanges 18. Since the pressure differential across the vanes 13, 14 is very substantial, the vanes are made very thick, as shown. The thickness of the vanes, 13, 14 also assists sealing thereof to the rotor 15.

The admission of the pressure fluid to, and its withdrawal from, the spaces 23, 24, 27, 28 of each of the rotors 15, is controlled by a common valve 29.

The valve 29 has a valve body 32 within which is a valve bore 33. A valve member 34 is slidably mounted within the bore 33. The valve member 34 is provided with lands 35, 36, 37 and with reduced diameter portions 38, 40, which are respectively disposed between the lands 35, 36 and 36, 37.

A passage 42, communicates, via an annular manifold 43, with the valve bore 33. The passage 42 is adapted to be connected by a pipe 39 to a source (not shown) of a high pressure fluid which is disposed in the aircraft fuselage, the pipe 39 passing through the centre of the respective member 12.

The valve body 32 is also provided with passages 44, 45, which communicate at one end with the valve bore 33, and which also communicate with pipes 46, 47, respectively. The pipe 46 communicates with the space 28 and also communicates by way of a pipe 48 with the space 27. The pipe 47 communicates with the space 23 and communicates by way of a pipe 50 with the space 24.

The valve body 32 is also provided with exhaust passages 51, 52 which lead to a common low pressure exhaust passage 53.

The valve member 34 is connected by a link 54 to a lever 55. The lever 55 is pivotally connected to a link 56 which is in turn pivotally connected to a lever 57 which may be turned about a pivot 58 by means of a handle 60.

The lever 55 is pivotally connected to a rod 61 which carries a cam follower 62. The cam follower 62 contacts a cam 63 which is carried externally of the rotor 15, the follower 62 being urged into contact with the cam 63 by means of a spring 64 which acts between the valve body 32 and the rod 61. If desired, however, the cam 63 could be carried internally of the rotor 15.

The valve member 34 may be placed in a neutral position (not shown) in which the land 36 is aligned with the annular manifold 43. In this position, the supply of pressure fluid through the passage 42 is unable to enter either the passage 44 or the passage 45. At the same time, each of the passages 44 and 45, is cut off from communication with its respective exhaust passage 51, 52. Thus pressure fluid in the said neutral position cannot be admitted to, or exhausted from, any of the spaces 23, 24, 27, 28. Accordingly, the neutral position is the one adopted when the pod 16 is stationary with respect to the aircraft.

When the valve member 34 is in the said neutral position, the lever 57 is in the dotted line position shown. When, however, it is desired to rotate the pods 16 towards, or into the vertical position, the lever 57 is moved from the dotted line position to the full line position shown in FIGURE 2. This causes the link 56 to move towards the left, as seen in FIGURE 2, whereby the valve member 34 is also moved towards the left and into the position shown in FIGURE 2. In this position, the passage 42, which is open to the supply of high pressure fluid, communicates by way of the reduced diameter portion 40, with the passage 45 and so with the pipes 47, 50. Thus high pressure fluid is admitted to the spaces 23, 24. At the same time, the passage 44 communicates by way of the reduced diameter portion 38 with the low pressure passage 51 whereby the spaces 27, 28 are connected to a low pressure fluid source (not shown). Accordingly, the rotors 15, and hence the pods 16 will rotate in the direction of the arrow 65.

Such rotation, however, will cause the rod 61 to be forced towards the right by virtue of the co-operation between the cam follower 62 and the cam 63. This rightward travel of the rod 61 will cause corresponding rightward travel of the valve member 34 against the action of the spring 64 until the valve member 34 is restored to the neutral position, after which no further rotation of the rotors 15 will occur.

The angle through which the rotors 15 will rotate, prior to the valve member 34 being restored to the said neutral position, depends of course upon the extent to which the lever 57 is moved from the dotted line position.

When it is desired to move the pods 16 back into, or towards, the horizontal position, the lever 57 is moved towards the dotted line position. This causes rightward travel of the link 56, and hence of the valve member 34. The valve member 34 is therefore placed in a position in which the passage 42, which is supplied with the high pressure fluid, communicates with the passage 44, and hence, via the pipes 46, 48, with the spaces 28, 27 respectively. At the same time the passage 45 communicates by way of the reduced diameter portion 40 with the drain passage 52, whereby the spaces 23, 24 also communicate with the low pressure fluid source. Accordingly the rotors 15 will rotate in the direction opposite to that of the arrow 65.

If desired, each of the rotors 15 may be controlled by its own individual valve 29 so that the pods 16 may be set in different positions from each other.

If the pods 16 are required to be placed only in either the substantially vertical or the horizontal position, then the lever 57 may be replaced by a button operated actuator.

Although the member 12 is shown in FIGURE 2 as having two vanes 13, 14, it could have one, three or four vanes if desired. As the number of vanes are increased, however, the angle through which the pods 16 can be rotated is, of course, decreased.

FIGURE 3 illustrates a modification of the invention which will not be described in detail since it is generally similar in construction to that shown in FIGURE 2, like reference numerals indicating like parts.

In FIGURE 3, however, the pipe 47 leading from the valve 29 contains a restriction 70. A diaphragm chamber 71 is divided by diaphragm 71 into compartments 73, 74, the diaphragm 71 being urged towards a central position by springs 75, 76. Pipes 77, 78, which lead respectively to the compartments 74, 73 communicate with the pipe 47 on the upstream and downstream sides respectively of the restriction 70.

The diaphragm 72 is connected to a rod 80 which is pivotally connected to a link 81. The link 81 is pivotally connected to a rod 82, which is connected to the valve member 34, and to a link 83 which is pivotally connected to the lever 55.

In operation, when it is desired to rotate the pods 16 towards, or into, the vertical position, the lever 57 is moved from the neutral position indicated in dotted lines to the full line position shown in FIGURE 3. As in the FIGURE 2 construction, this causes the link 56 and the valve member 34 to move towards the left, whereby high pressure fluid is supplied to the pipes 47, 50 and so to the spaces 23, 24, whereby to rotate the rotor 15.

If the rotation of the rotor 15 is rapid, there will be a high rate of flow of fluid through the pipe 47 and hence there will be a correspondingly large pressure drop across the restriction 70. This pressure drop, however, will urge the diaphragm 72, and hence the rod 80, to move towards the right, as seen in FIGURE 3, thus opposing initial displacement of the valve member 34.

The valve member 34 will be restored to its neutral position either by the cam 63 and cam follower 62 or by displacement of the diaphragm 72 resulting from the high velocity of fluid flow through the pipe 47. Thus what may be termed a "velocity feed back" is provided which exercises a stablising effect should the lever 57 be moved rapidly. This stabilising effect is reduced to zero as the velocity of flow through the pipe 47 becomes low when the parts are nearly restored to the neutral position.

If desired, the lever 57, instead of being moved manually, may be actuated electrically by an aircraft stabiliser (not shown) which employs gyroscopes which operate electrical equipment. The aircraft stabiliser may maintain lateral stability of the aircraft by producing differential rotational movement, when necessary, of the two pods 16.

The need for such differential rotational movement of the pods 16 can be brought about by slight differences in thrust from the two engines 17 or by slight differences in the angular positioning of the two engines.

I claim:

1. In a vertical take-off aircraft, a pod rotatively mounted in respect thereto, a jet propulsion engine in said pod, and a piston and cylinder arrangement for effecting rotation of the pod, said piston and cylinder arrangement comprising a movable cylinder, a fixed piston mounted in said movable cylinder, control means for admitting pressure fluid to a selected side of the piston and for releasing it from the opposite side thereof, whereby to effect movement of the cylinder and pod, said control means including a housing and a single valve member which is settable in a neutral position therein in which the pressure fluid is prevented from being supplied to and released from said cylinder, and means, operative as a result of displacement of the valve member from the neutral position, to move the value member and to restore it to the neutral position after the piston and cylinder have moved relatively to an extent determined by the extent of valve member movement.

2. In a vertical take-off aircraft, a pod rotatively mounted in respect thereto, a jet propulsion engine in said pod, and a piston and cylinder arrangement for effecting rotation of the pod, said piston and cylinder arrangement comprising a rotary cylinder, a fixed piston mounted in said rotary cylinder, control means for admitting pressure fluid to a selected side of the piston and for releasing it from the opposite side thereof, whereby to effect rotary movement of the cylinder and pod, said control means including a housing and a single valve member which is settable in a number of positions therein including a neutral position in which the pressure fluid is prevented from being supplied to and released from said cylinder, and means, operative as a result of displacement of the valve member from the neutral position, to move the valve member and to restore it to the neutral position after the cylinder has rotated through an angular distance which is related to the extent to which the valve member had been displaced from the neutral position.

3. In a vertical take-off aircraft, a pod rotatively mounted in respect thereto, a jet propulsion engine in said pod, and a piston and cylinder arrangement for effecting rotation of the pod, said piston and cylinder arrangement comprising a rotary cylinder, a fixed piston mounted in said rotary cylinder, conduit means for admitting pressure fluid to a selected side of the piston and for exhausting it from the opposite side thereof, whereby to effect rotary movement of the cylinder and pod, a valve housing and a valve member therein which controls flow through said conduit means and which is settable in a number of positions including a neutral position in which the pressure fluid is prevented from being supplied to and exhausted from said cylinder, means defining an orifice in said conduit means, and means controlled by the pressure difference across the orifice connected to move the valve member toward the neutral position during rotation of the cylinder through an angular distance which is related to the extent to which the valve member had been displaced from the neutral position, the said pressure difference being reduced as the valve member is moved towards the neutral position due to reduction in flow rate through the orifice.

4. In a vertical take-off aircraft, a pod which is rotatably mounted with respect to said aircraft, a jet propulsion engine mounted in said pod, and a piston and cylinder arrangement for effecting rotation of the pod between an horizontal and a vertical position, said piston and cylinder arrangement comprising a rotary cylinder connected to said pod, a fixed piston mounted in said rotary cylinder, control means for admitting pressure fluid to a selected side of the piston and for exhausting it from the opposite side thereof, whereby to effect rotary movement of the cylinder, said control means including a valve housing and a single valve member which is settable therein to any of a number of positions including a neutral position in which the pressure fluid is prevented from being supplied to and exhausted from said cylinder, a cam mounted on the exterior of the cylinder, a control lever, a linkage connecting the control lever to the valve member so that movement of the control lever in a given direction from a central position effects corresponding movement of the valve member from the neutral position, and a cam follower carried by said linkage and engaging the said cam, the said cam follower being so connected to said linkage as to cause movement of the valve member in the opposite direction to that caused by the control lever, and the valve member being thereby restored by said cam to the neutral position after the cylinder has rotated through an angular distance which is related to the extent to which the valve member had been displaced by the control lever from the neutral position.

5. A vertical take-off aircraft as claimed in claim 4 in which there are two pods which are separately mounted at the opposite wing tips of the aircraft, a separate piston and cylinder arrangement being adapted to effect rotation of each pod whereby stability control is available.

6. In a vertical take-off aircraft, a pod which is rotatably mounted with respect to said aircraft, a jet propulsion engine mounted in said pod, and a piston and cylinder arrangement connected for effecting rotation of the pod, said piston and cylinder arrangement comprising a rotary cylinder, radially extending flanges mounted in and carried by said cylinder, a cylindrical member mounted between the radially extending flanges, vanes which are carried by the cylindrical member and which constitute pistons within said cylinder, control means for admitting pressure fluid to a selected side of each piston and for exhausting it from the opposite side thereof, whereby to effect rotary movement of the cylinder and pod, said control means including a single valve member which is settable in any one of a number of positions including a neutral position in which the pressure fluid is prevented from being supplied to and exhausted from said cylinder, and means operative as a result of displacement of the valve member from the neutral position, to move the valve member and to restore it to the neutral position after the cylinder has rotated through an angular distance which is related to the extent to which the valve member had been displaced from the neutral position.

7. In a vertical take-off aircraft, a pod which is rotatably mounted with respect to said aircraft, a jet propulsion engine mounted in said pod, and a piston and cylinder arrangement connected for effecting rotation of the pod, said piston and cylinder arrangement comprising a rotary cylinder, a fixed piston mounted in said rotary cylinder, conduit means for admitting pressure fluid to a selected side of the piston and for exhausting it from the opposite side thereof, whereby to effect rotary movement of the cylinder, a single valve member which controls flow through said conduit means and which is settable in a number of positions including a neutral position in which the pressure fluid is prevented from being supplied to and exhausted from said cylinder, means defining an orifice in said conduit means, a chamber, a diaphragm dividing said chamber into two compartments, further conduit means connecting one of said compartments to the upstream side of said orifice, and the other of said compartments to the downstream side of said orifice, rod means between said diaphragm and said valve member to move said valve member in accordance with movements of said diaphragm, which are controlled by the pressure difference across said orifice, whereby said valve member is restored by such movement toward the neutral position after the cylinder has rotated through an angular distance which is related to the extent to which the valve member has been displaced from the neutral position, the said pressure difference being reduced as the valve member is moved towards the neutral position as a result of reduced flow rate in said conduit.

8. The combination as claimed in claim 7 in which said rotary cylinder is provided with cam means, a follower for said cam means, and mechanism associating said follower for augmenting the movement of said valve member under the action of said diaphragm.

References Cited in the file of this patent

UNITED STATES PATENTS

| | | |
|---|---|---|
| 546,419 | Deam | Sept. 17, 1895 |
| 2,400,418 | Hofbauer | May 14, 1946 |
| 2,520,115 | Cahill et al. | Aug. 29, 1950 |
| 2,654,348 | Beck | Oct. 6, 1953 |
| 2,909,195 | Keyt | Oct. 20, 1959 |

FOREIGN PATENTS

| | | |
|---|---|---|
| 203,765 | Great Britain | Sept. 10, 1923 |
| 571,979 | Germany | Mar. 16, 1933 |
| 1,039,846 | Germany | Sept. 25, 1958 |